United States Patent

Goold et al.

(10) Patent No.: US 9,273,749 B2
(45) Date of Patent: Mar. 1, 2016

(54) LOW PROFILE THREE PARAMETER ISOLATORS AND ISOLATION SYSTEMS EMPLOYING THE SAME

(71) Applicant: HONEYWELL INTERNATIONAL INC., Morristown, NJ (US)

(72) Inventors: Ryan Goold, Glendale, AZ (US); Zach Rogers, Phoenix, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 33 days.

(21) Appl. No.: 14/229,563

(22) Filed: Mar. 28, 2014

(65) Prior Publication Data

US 2015/0276008 A1    Oct. 1, 2015

(51) Int. Cl.
| | |
|---|---|
| F16M 13/00 | (2006.01) |
| F16F 13/00 | (2006.01) |
| F16F 13/06 | (2006.01) |
| F16F 15/02 | (2006.01) |
| F16F 1/02 | (2006.01) |

(52) U.S. Cl.
CPC ............... *F16F 13/00* (2013.01); *F16F 13/06* (2013.01); *F16F 15/022* (2013.01); *F16F 1/027* (2013.01); *F16F 2234/06* (2013.01); *F16F 2238/00* (2013.01)

(58) Field of Classification Search
CPC ....... F16F 15/02; F16F 15/022; F16F 15/023; F16F 13/00; F16F 13/002; F16F 13/007; F16F 7/10; F16F 7/1028; F16F 7/1034; F16F 9/483; B64G 2001/228; B64G 1/22
USPC ....................................................... 248/562
See application file for complete search history.

(56) References Cited

U.S. PATENT DOCUMENTS

| | | | | |
|---|---|---|---|---|
| 2,690,529 | A | | 9/1954 | Lindblad |
| 2,930,455 | A | * | 3/1960 | Williams ............... F16F 15/027 188/298 |
| 2,939,718 | A | * | 6/1960 | Jackman .................. B60G 5/04 267/248 |
| 3,247,731 | A | * | 4/1966 | Chapman ................. F16J 15/52 74/18.1 |
| 3,770,232 | A | * | 11/1973 | Blake ........................ F16F 3/10 267/136 |

(Continued)

FOREIGN PATENT DOCUMENTS

| | | |
|---|---|---|
| EP | 2518366 A2 | 10/2012 |
| EP | 2524872 A1 | 11/2012 |

OTHER PUBLICATIONS

Extended EP Search Report for EP 15158905.8-1755 dated Jan. 10, 2015.

*Primary Examiner* — Mark Wendell
(74) *Attorney, Agent, or Firm* — Ingrassia Fisher & Lorenz, P.C.

(57) ABSTRACT

Embodiments of a low profile three parameter isolator are provided, as are embodiments of an isolation system employing one or more low profile three parameter isolators. In one embodiment, the three parameter isolator includes a first damper and a flat plate structure, which is coupled to the first damper and which extends substantially orthogonal to the longitudinal axis of the isolator. A main spring is formed in the flat plate structure and is coupled in series with the first damper, as taken along a first load path through the three parameter isolator. A tuning spring is also formed in the flat plate structure such that the tuning spring is coupled in parallel with the main spring and in series with the first damper, as taken along a second load path through the three parameter isolator.

20 Claims, 5 Drawing Sheets (56) References Cited

U.S. PATENT DOCUMENTS

| | | | |
|---|---|---|---|
| 4,351,515 A * | 9/1982 | Yoshida | B60G 17/0157 188/267 |
| 4,475,440 A * | 10/1984 | Rabe | B62D 5/083 91/375 A |
| 4,957,279 A * | 9/1990 | Thorn | F16F 13/04 248/562 |
| 5,261,266 A * | 11/1993 | Lorenz | B25J 13/084 73/1.15 |
| 5,332,070 A * | 7/1994 | Davis | F16F 9/16 188/280 |
| 5,429,338 A * | 7/1995 | Runge | F16F 3/0876 248/583 |
| 5,492,312 A * | 2/1996 | Carlson | F16F 9/535 188/267.2 |
| 5,690,320 A * | 11/1997 | Kanda | F16F 13/16 267/140.12 |
| 5,716,037 A * | 2/1998 | Haak | E04H 9/023 248/562 |
| 5,992,584 A * | 11/1999 | Moody | F16F 9/10 188/297 |
| 6,056,519 A | 5/2000 | Morita et al. | |
| 6,378,851 B1 * | 4/2002 | McGuire | F16F 13/06 267/140.13 |
| 6,419,213 B2 * | 7/2002 | Murai | F16F 13/14 267/140.12 |
| 6,517,060 B1 * | 2/2003 | Kemeny | F16F 1/32 267/136 |
| 6,634,472 B1 * | 10/2003 | Davis | F16F 7/10 188/378 |
| 6,896,109 B2 | 5/2005 | Kelso et al. | |
| 6,916,017 B2 | 7/2005 | Noe | |
| 7,314,213 B2 * | 1/2008 | Tanaka | F16F 13/10 267/140.5 |
| 7,673,510 B2 | 3/2010 | Hotelling et al. | |
| 8,327,985 B2 * | 12/2012 | Boyd | F16F 9/16 188/298 |
| 8,611,735 B2 | 12/2013 | Sekimoto | |
| 8,726,762 B2 * | 5/2014 | Rogers | B64G 1/283 188/378 |
| 2005/0206054 A1 * | 9/2005 | Nishi | F16F 1/3814 267/140.5 |
| 2005/0217954 A1 * | 10/2005 | Hindle | B64G 1/641 188/298 |
| 2006/0180417 A1 | 8/2006 | Ruebsamen et al. | |
| 2007/0176337 A1 | 8/2007 | Wilke et al. | |
| 2008/0289921 A1 * | 11/2008 | Mori | H01H 3/605 188/316 |
| 2010/0109219 A1 * | 5/2010 | Melz | F16F 15/005 267/140.15 |
| 2010/0320358 A1 * | 12/2010 | Boyd | F16F 9/16 248/636 |
| 2013/0134257 A1 | 5/2013 | Barber et al. | |

* cited by examiner

LOW PROFILE THREE PARAMETER ISOLATORS AND ISOLATION SYSTEMS EMPLOYING THE SAME

TECHNICAL FIELD

The present invention relates generally to isolation devices and, more particularly, to three parameter isolators having reduced lengths or heights and isolation systems employing the same.

BACKGROUND

Vibration isolation systems are employed in a wide variety of applications to minimize the transmission of disturbances forces between two bodies or structures. For example, satellite are often equipped with vibration isolation systems to minimize the transmission of vibratory forces emitted from attitude adjustment devices (e.g., control moment gyroscopes or reaction wheels) to other vibration-sensitive components (e.g., optical payloads) carried by the satellite. The performance of a vibration isolation system is largely determined by the number of isolators included within the system, the manner in which the isolators are arranged, and the vibration attenuation characteristics of each individual isolator. Vibration isolation systems employing three parameter isolators, which behave mechanically as a primary spring in parallel with a series-coupled secondary spring and damper, provide superior attenuation of high frequency vibratory forces as compared to vibration isolation systems employing other types of passive isolators, such as viscoelastic isolators. An example of a three parameter isolator is the D-STRUT® isolator developed and commercially marketed by Honeywell, Inc., currently headquartered in Morristown, N.J. Such isolators are often single Degree of Freedom (DOF), axially-damping devices well-suited for usage within multi-point mounting arrangements.

By conventional design, three parameter isolators are often imparted with a relatively length, cylindrical or strut-like form factor. As a result, the usage of three parameter isolators may be precluded by packaging constraints in instances wherein a relatively limited distance is provided between isolator mount points. While it may be possible to extend the distance between the mount points by system redesign, this solution is less than ideal and may negatively impact overall system performance; e.g., system redesign may result in wider mode spread, less attenuation at a given frequency or frequencies, and/or an undesirable increase in isolator loads and strokes. As an alternative solution, the isolation system can be built using low profile viscoelastic mounts having generally puck-shaped form factors. However, the usage of viscoelastic mounts in place of three parameter isolators typically requires a tradeoff in the performance of the isolation system. Moreover, the damping and stiffness characteristics of viscoelastic mounts typically vary in a non-linear manner with changes in temperature and load, which can render viscoelastic mount-based isolation systems more difficult to design and predict and less effective at attenuating vibrations over a wide frequency range.

There thus exists an ongoing need to provide embodiment of a low profile three parameter isolator, which has a reduced length or height and which is well-suited for usage within an isolation system capable of proving high fidelity damping and stiffness in six degrees of freedom. Ideally, such a low profile three parameter isolator would be readily manufacturable, durable, lightweight, and characterized by a relatively low part count. It would also be desirable for such a three parameter isolator to provide damping and stiffness properties that vary in a substantially linear manner with changes in load and temperature. Finally, it would be desirable to provide embodiments of an isolation system including one or more low profile three parameter isolators having the foregoing characteristics. Other desirable features and characteristics of embodiments of the present invention will become apparent from the subsequent Detailed Description and the appended Claims, taken in conjunction with the accompanying drawings and the foregoing Background.

BRIEF SUMMARY

Embodiments of a low profile three parameter isolator are provided. In one embodiment, the three parameter isolator includes a first damper and a flat plate structure, which is coupled to the first damper and which extends substantially orthogonal to the longitudinal axis of the isolator. A main spring is formed in the flat plate structure and is coupled in series with the first damper, as taken along a first load path through the three parameter isolator. A tuning spring is also formed in the flat plate structure such that the tuning spring is coupled in parallel with the main spring and in series with the first damper, as taken along a second load path through the three parameter isolator.

In further embodiments, the three parameter isolator includes first and second mounting interfaces, at least one damper coupled between the first and second mounting interfaces, and a main spring coupled in series with the at least one damper, as taken along a first load path extending between the first and second mounting interfaces. A tuning spring is further coupled in parallel with the main spring and in series with the at least one damper, as taken along a second load path extending between the first and second mounting interfaces. The main spring and the tuning spring each include or assume the form of substantially concentric disc-shaped machined springs, which extend radially outward from the longitudinal axis.

Embodiments of an isolation system for supporting an isolated body, such as a payload, are still further provided. In one embodiment, the isolation system includes one or more three parameter isolators. Each three parameter isolator includes a first damper, a flat plate structure coupled to the first damper and extending substantially orthogonal to the longitudinal axis of the isolator, and a main spring formed in the flat plate structure and coupled in series with the first damper, as taken along a first load path through the three parameter isolator. A tuning spring is also formed in the flat plate structure such that the tuning spring is coupled in parallel with the main spring and in series with the first damper, as taken along a second load path through the three parameter isolator. The isolation system further includes mounting hardware, which is coupled to the one or more three parameter isolator and which is configured to join the one or more three parameter isolator to the isolated body.

BRIEF DESCRIPTION OF THE DRAWINGS

At least one example of the present invention will hereinafter be described in conjunction with the following figures, wherein like numerals denote like elements, and.

For simplicity and clarity of illustration, the drawing figures illustrate the general manner of construction, and descriptions and details of well-known features and techniques may be omitted to avoid unnecessarily obscuring the invention. Additionally, elements in the drawings figures are not necessarily drawn to scale. For example, the dimensions of some of the elements or regions in the figures may be exaggerated relative to other elements or regions to help improve understanding of embodiments of the invention.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
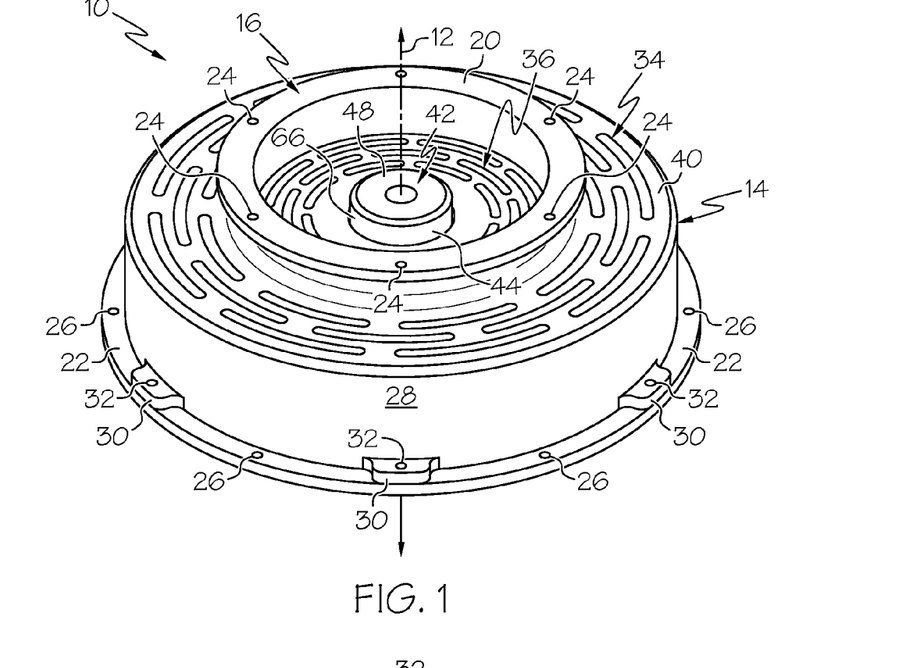
FIGS. 1-3 are isometric, top-down, and cross-sectional views, respectively, of a low profile three parameter isolator, as illustrated in accordance with an exemplary embodiment of the present invention.
Figure 2:
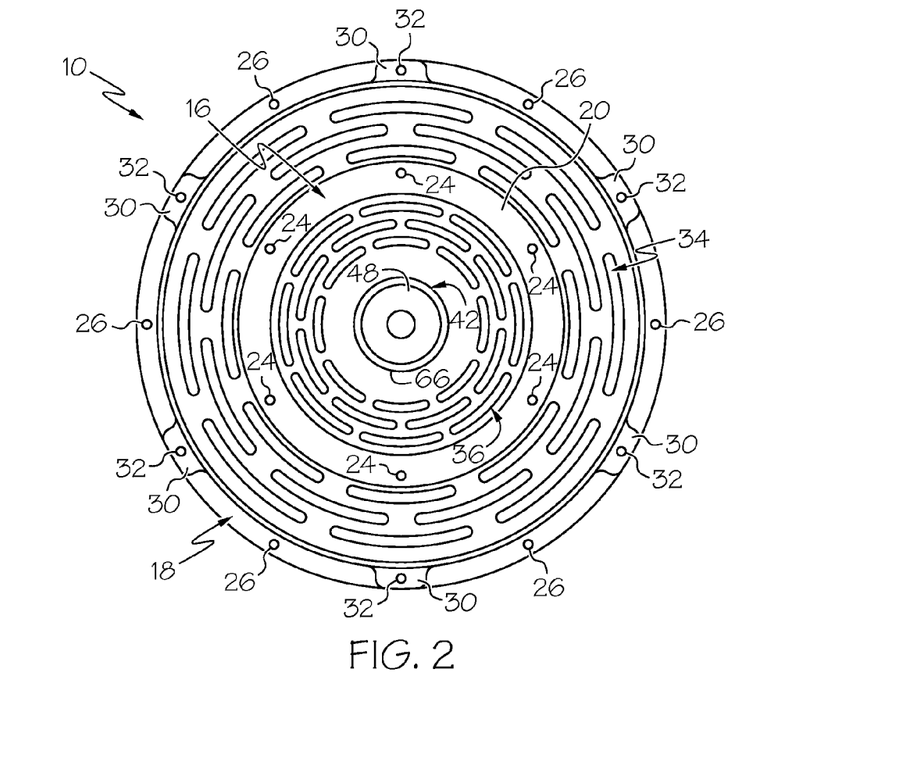
Figure 3:
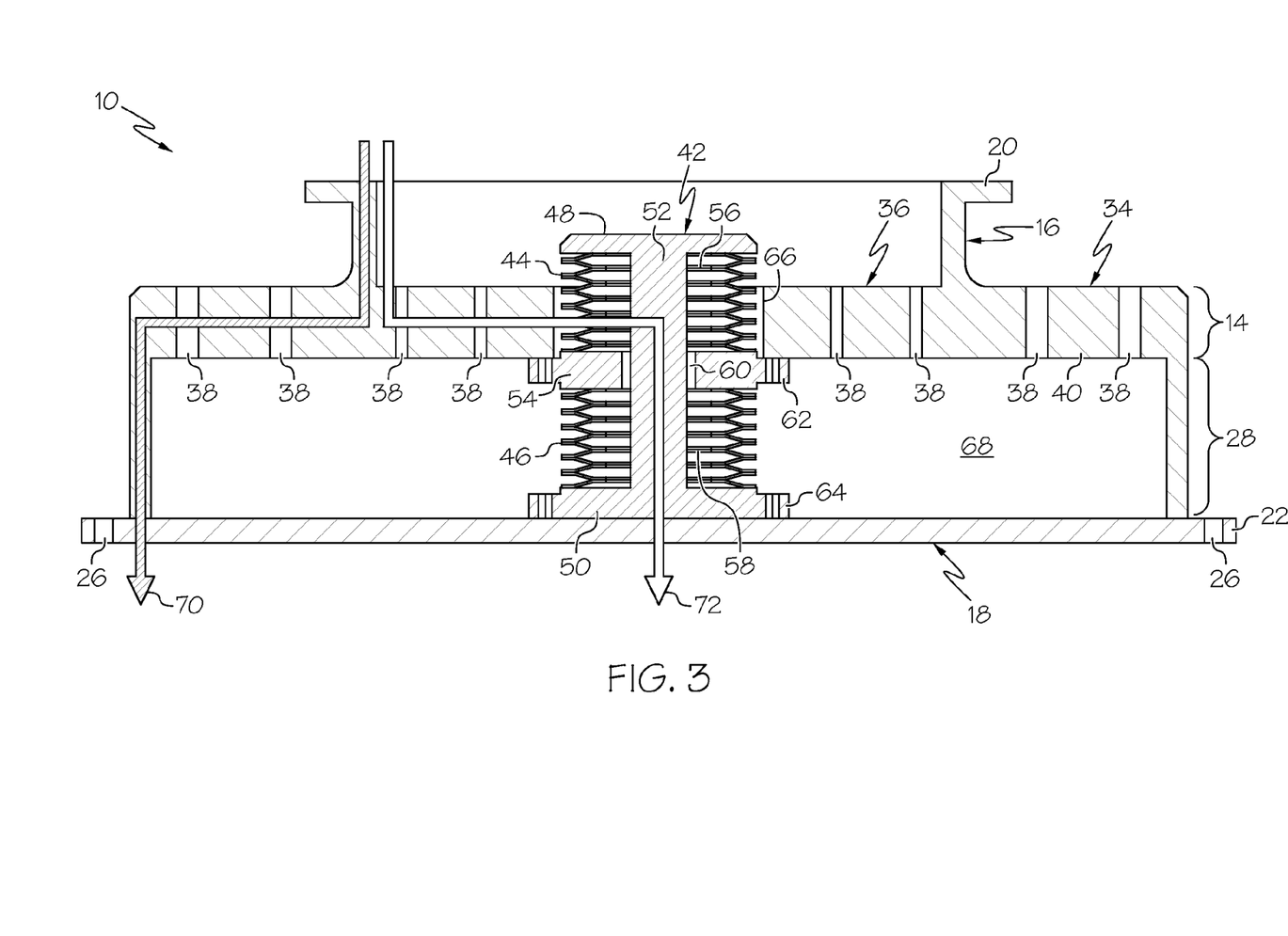
Figure 7:
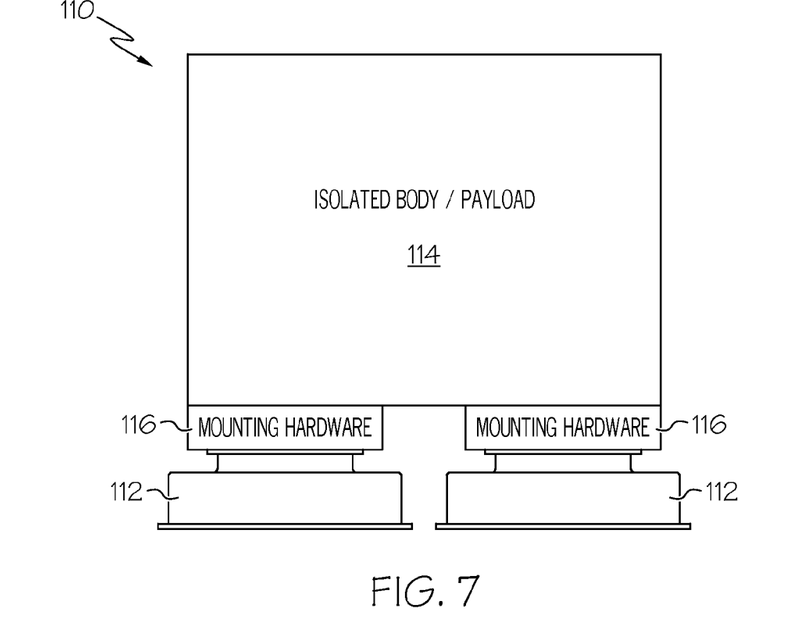
FIG. 7 generically or schematically illustrates one possible manner in which an isolation system can be produced utilizing a number of the three parameter isolators shown in FIGS. 1-3.

FIGS. 1, 2, and 3 are isometric, top-down, and cross-sectional views, respectively, of a low profile three parameter isolator 10, as illustrated in accordance with an exemplary embodiment of the present invention. Isolator 10 is considered "low profile" in that the length of isolator 10 is significantly reduced as compared to other known three parameter isolators having an elongated, strut-like form factor. In contrast to such conventionally-known isolators, isolator 10 may have a generally puck-shaped or pad-shaped form factor, such as that shown in FIGS. 1-3. Isolator 10 is considered a "three parameter" device in that isolator 10 behaves, at least in part, as a primary spring ($K_A$) coupled in parallel with a series-coupled secondary spring ($K_B$) and damper ($C_A$). In the embodiment shown in FIGS. 1-3, three parameter isolator 10 is a single degree-of-freedom (axially-damping) device having a working axis corresponding to the longitudinal axis or centerline of isolator 10 (represented in FIG. 1 by double-headed arrow 12). Isolator 10 is thus well-suited for usage in a multi-point mounting arrangement; e.g., isolator 10 can be combined with a number of like isolators to provide high fidelity damping in six degrees of freedom. Such multi-point mounting arrangements are usefully employed in spacecraft isolation systems utilized to attenuate vibrations or impact forces transmitted between a spacecraft and a payload carried by the spacecraft. It is emphasized, however, that isolator 10 (and the other isolators described herein) can be utilized in any spaceborne, airborne, terrestrial, or other application wherein it is desired to attenuate vibrations or impact loads between two objects or mount points. An example of a multi-point isolation system including isolator 10 and a number of like isolators is described below in conjunction with FIG. 7.

Among other components, three parameter isolator 10 includes a flat plate structure 14, an annular collar 16 fixedly coupled to structure 14 and extending axially therefrom, and a base piece 18 attached to structure 14 opposite collar 16. Additionally, isolator 10 includes opposing mounting interfaces 20 and 22, which serve as the mechanical inputs/output of isolator 10. Mounting interfaces 20 and 22 can each assume any form enabling the installation of isolator 10 in a larger isolation system, whether by attachment utilizing hardware (e.g., fasteners, clamps, brackets, or the like), by bonding (e.g., welding or soldering), or other means. In the illustrated embodiment, mounting interface 20 assumes the form of a flanged terminal end of collar 16 having a plurality of fastener openings 24 therein (FIGS. 1 and 2). Similarly, mounting interface 22 is formed in an outer annular region of base piece 18 having a plurality of circumferentially-spaced fastener openings 26 therein. If isolator 10 is incorporated into an isolation system deployed onboard a spacecraft, an aircraft, or other platform carrying a vibration-sensitive payload, mounting interface 20 may be bolted or otherwise attached to palette or bench supporting a vibration-sensitive component, while opposing mounting interface 22 is mounted to the platform. Alternatively, this mounting arrangement may be inverted such that mounting interface 20 is mounted to the platform, while mounting interface 22 is attached to the payload. In further embodiments, isolator 10 may be mounted between other bodies or objects between which attenuation of disturbance forces is desired.

Three parameter isolator 10 further includes at least one axial extension, which extends from flat plate structure 14 to base piece 18 along an axis substantially parallel to the longitudinal axis 12 or centerline of isolator 10 (FIG. 1). In the exemplary embodiment shown in FIGS. 1-3, the axial extension assumes the form of an annual sidewall 28 (FIGS. 1 and 3), which extends axially from outer circumferential portion of flat plate structure 14 to an outer circumferential portion of base piece 18. Flat plate structure 14, annular collar 16, and annular sidewall 28 can be produced as separate pieces, which are subsequently joined together utilizing hardware, by bonding (e.g., soldering or welding), or in an another manner (e.g., by threaded attachment). It is preferred, however, that flat plate structure 14, annular collar 16, and annular sidewall 28 are integrally formed as a single machined piece. A number of tabs 30 (FIGS. 1 and 2) project radially outward from the lower circumferential edge of annular sidewall 28 and include a number of fastener openings 32 therein. When isolator 10 is assembled, openings 32 align with corresponding openings provided in base piece 18 to enable attachment of piece 18 to tabs 30 (and, therefore, attachment of base piece 18 to annular sidewall 28, flat plate structure 14, and annular collar 16) utilizing a plurality of bolts or other such fasteners (not shown).

At least two springs or spring elements are formed in flat plate structure 14, namely, a main spring and a secondary or tuning spring. In the exemplary embodiment shown in FIGS. 1-3, a main spring 34 ($K_A$) is formed in an outer annular portion of structure 14, while a tuning spring 36 ($K_B$) is formed in an inner annular portion of structure 14. Main spring 34 is consequently concentric with and circumscribes tuning spring 36. Flat plate structure 14 can be any body or assembly of bodies having generally flat, disk-shaped, or plate-like geometry and orientation substantially orthogonal to longitudinal axis 12. As indicated in FIGS. 1-3, flat plate structure 14 may include a monolithic or single piece diaphragm wall 40 in which main spring 34 and tuning spring 36 are formed. In the illustrated example, the thickness of the outer annual region of flat plate structure 14 in which main spring 34 is formed is substantially equivalent to the thickness of the inner annular region in which tuning spring 36 is formed. Consequently, main spring 34 and tuning spring 36 are bound by first and second planes, which are spaced along longitudinal axis 12 and substantially orthogonal thereto. In further embodiments, the thicknesses of the inner and outer annular regions of structure 14 may be varied (e.g., the inner annular region of diaphragm wall 40 in which spring 36 is formed may be thinned as compared to the outer annular region of wall 40 in which spring 34 is formed) to tune the respective characteristics of springs 34 and 36. Notably, the location at which annular collar 16 is joined to flat plate structure 14 is located between the outer annular region of structure 14 (and wall 40) in which main spring 34 is formed and the inner annular region of structure 14 (and wall 40) in which tuning spring 36 is formed.

During manufacture of isolator 10, a number of voids or openings 38 (identified in FIG. 3) may be cut into or otherwise formed in flat plate structure 14 to define main spring 34 in the outer annular portion of structure 14 (and, therefore, in an outer annular region of diaphragm wall 40) and to further define tuning spring 36 in the inner annular portion of structure 14 (and, thus, in an inner annular region of diaphragm wall 40). A non-exhaustive list of processes suitable for forming openings 38 includes Electrical Discharge Machining, milling, and laser cutting. Openings 38 (FIG. 3) can be cut in any pattern suitable for imparting main spring 34 and tuning spring 36 with their desired characteristics. In embodiments wherein main spring 34 and tuning spring 36 are created via removal of material from flat plate structure 14, springs 34 and 36 may be considered disc-shaped machined springs, which are substantially concentric and which extend radially outward from longitudinal axis 12 of isolator 10.

Three parameter isolator 10 further includes at least one damper 42 ($C_A$), which is coupled between a central portion of structure 14 and a central portion of base piece 18. Damper 42 can assume the form of any damping device capable of attenuating vibrations including, but not limited to, other types of passive damping devices (e.g., eddy current, viscoelastic, and pneumatic dampers) as well as active damping devices (e.g., voice coil and piezoelectric dampers). In certain embodiments, damper 42 may be a hermetically-sealed fluid damper containing a damping fluid, such as a silicone damping liquid. Referring specifically to the illustrated example, and as shown most clearly in FIG. 3, damper 42 is a fluid damper including the following components: (i) opposing metal bellows 44 and 46, (ii) opposing bellows end caps 48 and 50, (iii) a connecting rod 52, and (iv) a disc-shaped damper piston 54. For ease of reference, bellows 44 and end cap 48 may be respectively referred to as the "upper" bellows and the "upper" end cap hereafter; while bellows 46 and end cap 50 may be referred to as the "lower" bellows and end cap. Such terms are utilized herein in reference to the illustrated orientation of damper 42 (and, more generally, three parameter isolator 10) shown in FIGS. 1-3 and with the understanding that damper 42 (and isolator 10) may assume any orientation in three dimensional space.

Upper end cap 48 is sealingly joined to the upper circumferential edge of upper bellows 44, while lower end cap 50 is sealingly joined to the lower circumferential edge of lower bellows 46. Any joinder technique suitable for creating a fluid-tight bond between end caps 48 and 50 and bellows 44 and 46, respectively, may be utilized for this purpose including circumferential welding. Connecting rod 52 extends axially from upper end cap 48, through a central opening provided in piston 54, and to lower end cap 50 to fixedly couple end caps 48 and 50. Damper piston 54 is resiliently coupled between bellows 44 and 46. Opposing hydraulic chambers 56 and 58 are defined by bellows 44 and 46, end caps 48 and 50, connecting rod 52, and piston 54. Chambers 56 and 58 are fluidly coupled by an annulus 60 further defined by an inner circumferential surface of damper piston 54 and an outer circumferential surface of connecting rod 52. Chambers 56 and 58 are fluid-tight and configured to sealingly contain a damping fluid, such as a silicone-based damping liquid. Isolator 10 may be initially produced and distributed without damping fluid, which may later be introduced into hydraulic chambers 56 and 58 prior to usage of isolator 10 utilizing a non-illustrated fill port.

Damper piston 54 includes a radial flange 62 projecting radially outward from piston 54 beyond bellows 44 and 46. Piston flange 62 is attached to a central region of flat plate structure 14 utilizing, for example, a plurality of bolts (not shown). In a similar manner, lower end cap 50 is affixed to a central region of base piece 18 by bolting or otherwise attaching base piece 18 to a radial flange 64 provided around cap 50. A central opening 66 is provided in flat plate structure 14 to accommodate the upper portion of damper 42. Upper bellows 44 extends through opening 66 such that upper end cap 48 is positioned on an opposing side of flat plate structure 14 as compared to damper piston 54 and lower end cap 50. During operation of isolator 10, damper piston 54 strokes in conjunction with deflection of tuning spring 36, bellows 44 and 46 expand and contract, the respective volumes of chambers 56 and 58 vary, and damping fluid is forced through annulus 60 to provide the desired damping effect. In the embodiment shown in FIGS. 1-3, damper 42 is wholly contained within or nested within isolator 10, and the majority of damper 42 is contained within an inner cavity 68 circumferentially bounded by annular sidewall 28. In further embodiments, other mounting arrangements may be utilized and various modifications may be made to the design of damper 42; e.g., in further embodiments, bellows 44 and 46 may be externally pressurized. Furthermore, multiple fluid dampers may be coupled between a central region of flat plate structure 14 and base piece 18 in other implementations.

By virtue of the above-described structural configuration, two parallel load paths are provided through isolator 10: (i) a first load path (represented by arrow 70 in FIG. 3), which extends from mounting interface 20, through annular collar 16, through the outer annular region of flat plate structure 14 (and therefore through main spring 34), through annular sidewall 28, through base piece 18, and to mounting interface 22; and (ii) a second load path (represented by arrow 72), which extends from mounting interface 20, through annular collar 16, through the inner annular region of flat plate structure 14 (and therefore through tuning spring 36), through damper 42, through base piece 18, and to mounting interface 22. It may also be stated that damper 42 is coupled in parallel with annular sidewall 28 (the axial extension) and in series with base piece 18, as taken along the first and second load paths, respectively. Isolator 10 thus comprises a three parameter device including a main spring (outer machined spring 34), which is coupled in parallel with a series-coupled secondary spring (inner machined spring 36) and a damper (fluid damper 42). As compared to other types of passive isolators, such as two parameter viscoelastic isolators, three parameter isolators provide superior attenuation of high frequency, low amplitude vibratory forces, such as jitter. Further discussion of three parameter isolators can be found in U.S. Pat. No. 5,332,070, entitled "THREE PARAMETER VISCOUS DAMPER AND ISOLATOR," issued Jan. 26, 1984; and U.S. Pat. No. 7,182,188 B2, entitled "ISOLATOR USING EXTERNALLY PRESSURIZED SEALING BELLOWS," issued Feb. 27, 2007; both of which are assigned to assignee of the instant application and incorporated by reference. Arrows 70 and 72 overlay only a portion of three parameter isolator 10 in FIG. 3 and each only include a single arrowhead for clarity of illustration; it will be appreciated that the parallel load paths provided through isolator 10 are bidirectional and generally axisymmetric, as taken about the longitudinal axis or centerline of isolator 10.

There has thus been provided an exemplary embodiment of a low profile three parameter isolator, which has a reduced length or height as compared to other known three parameter isolators (e.g., the length of isolator 10 may be less than the outer diameter thereof) and which is well-suited for usage in a multi-point mounting arrangement. The above-described isolator can thus be advantageously utilized in applications wherein it is desired to provide superior damping properties (as compared to a puck-shaped viscoelastic mount or other low profile two parameter isolator), while accommodating a relatively limited axial distance between isolator mount points. It will be appreciated that low profile three parameter isolator 10 shown in FIGS. 1-3 is provided by way of non-limiting example only and that various modifications can be made to isolator 10 without departing from the scope of the invention, as set-forth in the appended claims. For example, in further embodiments of the isolator, the main spring and tuning spring can be formed in inner and outer annular portions of the flat plate structure, respectively, while a number of dampers are positioned around the outer perimeter of the flat plate structure. To further emphasize this point, an exemplary embodiment of a low profile three parameter isolator having such a structural arrangement will now be described in conjunction with FIGS. 4-6.

Figure 4:
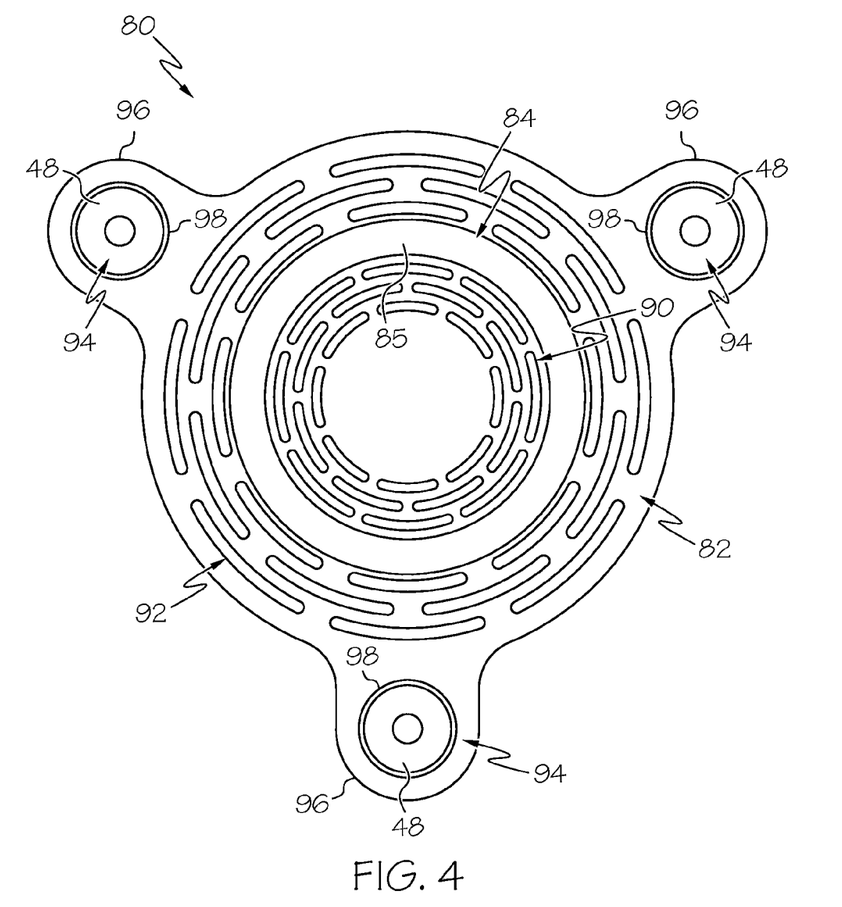
FIGS. 4-6 are top-down, side, and cross-sectional views, respectively, of a low profile three parameter isolator, as illustrated in accordance with a further exemplary embodiment of the present invention.
Figure 5:
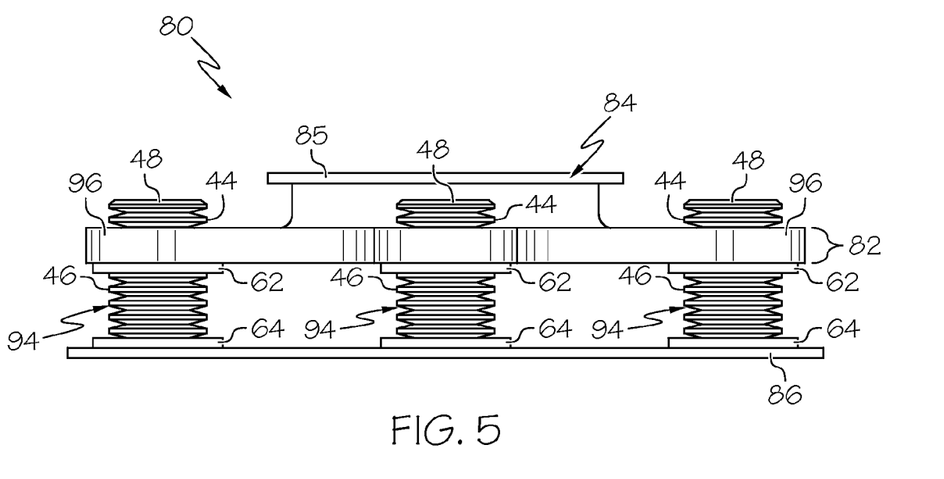
Figure 6:
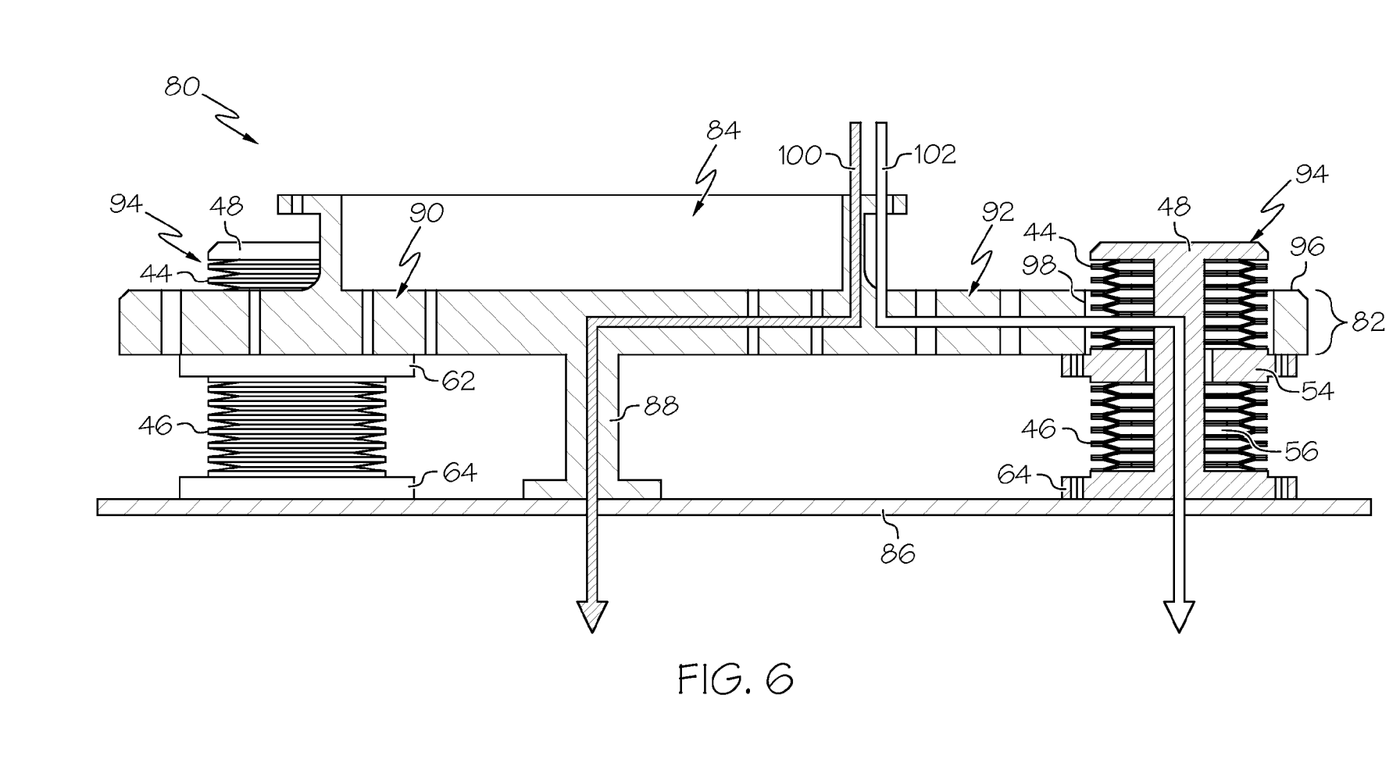

FIGS. 4-6 are top-down, side, and cross-sectional views, respectively, of a low profile three parameter isolator 80, as illustrated in accordance with a further exemplary embodiment of the present invention. In many respects, isolator 80 is similar to isolator 10 described above in conjunction with FIGS. 1-3. For example, three parameter isolator 80 includes a flat plate structure 82 positioned orthogonal to the longitudinal axis or centerline of isolator 80, an annular collar 84 extending axially from structure 82 and serving as a first mount point of isolator 80, a base piece 86 (shown in FIGS. 5 and 6) fixedly coupled to structure 82 and serving as a second mount point of isolator 80, an axial extension 88 (visible in FIG. 6) extending between structure 82 and base piece 86, a main spring 90 (FIGS. 4 and 6) formed in structure 82, and a tuning spring 92 (FIGS. 4 and 6) formed in structure 82 proximate main spring 90. However, in contrast to the springs of isolator 10 (FIGS. 1-3), main spring 90 is formed in an inner annular portion of flat plate structure 82 and is circumscribed by tuning spring 92, which is formed in an outer annular portion of structure 82. As a further difference, axial extension 88 (FIG. 6) assumes the form of an elongated column or post, which extends from a central portion of flat plate structure 82 to a central portion of base piece 86. As is the axial extension of isolator 10 (i.e., annular sidewall 28 shown in FIGS. 1-3), axial extension 88 extends substantially parallel to and is substantially concentric with the isolator's longitudinal axis or centerline. Once again, it is preferred (although by no means necessary) that flat plate structure 82, annular collar 84, and axial extension 88 are integrally produced as a single machined piece. Whether or not integrally formed with flat plate structure 82, annular collar 84 is joined to flat plate structure 82 at a location between the inner and outer annular portions of structure 82 in which springs 90 and 92 are formed, respectively.

Three parameter isolator 80 further includes a plurality of hermetically-sealed fluid dampers 94, which are coupled to and spaced about the outer perimeter of flat plate structure 82 in an annular array. More specifically, isolator 80 is produced to include a number of circumferentially-spaced tabs 96, which extend radially outward from flat plate structure 82 and may be integrally formed therewith. Each tab 96 includes an opening 98 therein through which a fluid damper 94 is received. In the illustrated example, fluid dampers 94 are substantially identical to damper 42 described above in conjunction with FIG. 3; thus, like reference numerals have been utilized to denote like structural elements. Detailed description of dampers 94 is not be repeated to avoid redundancy. The upper bellows 44 (FIGS. 5 and 6) of each damper 94 may extend through the opening 98 provided in the corresponding tab 96, the damper piston 54 (FIG. 6) of each damper 94 may be affixed to the tab 96 through a radial flange 62 (FIGS. 5 and 6) provided around the piston 54, and the lower end cap 50 (FIG. 6) may be affixed to base piece 86 through a radial flange 64 provided around cap 50. In this manner, the annular array of fluid dampers 94 is mechanically coupled between tuning spring 92 and base piece 86. Deflection of tuning spring 92 along the longitudinal axis of isolator 80 will thus result in translational movement of damper pistons 54 forcing damping fluid flow between the opposing hydraulic chambers 56 and 58 (FIG. 6) within each damper 94 to provide the desired damping effect. In further embodiments, fluid dampers 94 may be replaced by other types of damping devices, such as eddy current, viscoelastic, pneumatic, piezoelectric, or voice coil dampers, to list but a few examples.

Once again, two parallel loads paths are provided through the exemplary isolator. In the case of three parameter isolator 80 shown in FIGS. 4-6, a first load path (represented by arrow 100 in FIG. 6) extends from a mounting interface provided in or coupled to annular collar 84, through the body of collar 84, through the inner annular region of flat plate structure 82 (and therefore through main spring 90), through axial extension 88, through the body of base piece 86, and to a mounting interface provided in or coupled to base piece 86. Similarly, a second load path (represented by arrow 102) extends from the mounting interface associated with annular collar 84, through the body of collar 84, through the outer annular region of flat plate structure 82 (and therefore through tuning spring 92), through the annular array of dampers 94, through the body of base piece 86, and to the mounting interface associated with piece 86. Isolator 80 thus comprises a three parameter device including a main spring (inner machined spring 90), which is coupled in parallel with a series-coupled secondary spring (outer machined spring 92) and one or more dampers (fluid dampers 94). However, in contrast to other known three parameter isolators, three parameter isolator 80 is axially compact and has a generally puck-shaped or pad-shaped form factor. Isolator 80 is also relatively durable, lightweight, and characterized by a relatively low part count.

Figure 8:
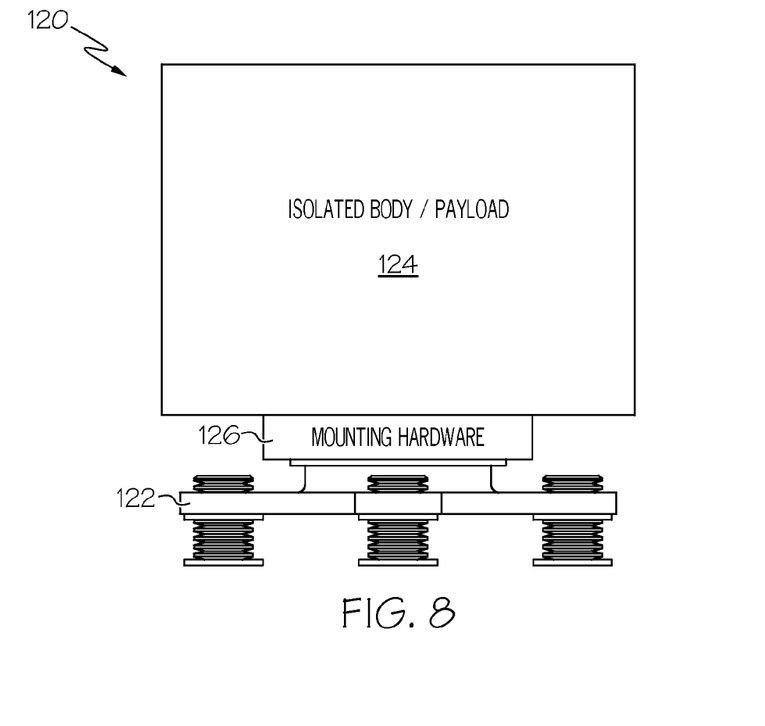
FIG. 8 generically or schematically illustrates one possible manner in which an isolation system can be produced utilizing the three parameter isolator shown in FIGS. 4-6.

The low profile three parameter isolators described herein are advantageously employed within an isolation system providing high fidelity isolation and stiffness in six degrees of freedom. In the case of isolator 10 shown in FIGS. 1-3, which is generally designed as a single DOF, axially-damping device, a number of isolators identical or similar to isolator 10 can be utilized to produce a multi-point isolation system. Further emphasizing this point, FIG. 7 generically illustrates an isolation system 110 including a plurality of isolators 112, which may be substantially identical to isolator 10 shown in FIGS. 1-3. Isolation system 110 may include three or more isolators 112, which are mounted to isolated body 114 (e.g., a reaction wheel array, a control moment gyroscope array, or other payload) utilizing mounting hardware 116 (generically shown for two isolators 112), such as bolts, brackets, clamps, or the like. Collectively, isolators 112 provide damping of vibration forces transmitted to or from isolated body 114 through isolation system 110. By comparison, isolator 80 shown in FIGS. 4-6 may be utilized as a single DOF, axially-damping, but can also be utilized as a multiple DOF damping device. Due to the relatively broad spacing of dampers 94 from the longitudinal axis or centerline of isolator 80 (which can be adjusted as desired by increasing or decreasing the diameter of flat plate structure 82 and/or the length of radial tabs 96), a relatively large moment arm is created and sufficient movement may occur within dampers 94 to provide appreciable damping along and around all three orthogonal axes. Thus, as indicated in FIG. 8, an isolation system 120 can be produced including a single, relatively wide-spread isolator 122, which may be identical or similar to isolator 80 (FIGS. 4-6) and which is attached to an isolated body 124 via mounting hardware 126. Isolator 122 may thus provide six DOF vibration isolation of disturbance forces transmitted to or from body 124 in a single package. The dampers within three parameter isolator 122 may be configured to damping lateral movement of isolated body 124 relative to isolator 122 by sheer movement of the bellows and squeeze film damping. In one embodiment, isolator 122 may have a maximum planform dimension that is at least one half a maximum planform dimension of body 124. This example notwithstanding, a multi-point isolation system employing multiple isolators similar to isolator 80 can be produced in further embodiments.

The foregoing has thus provided multiple exemplary embodiments of a low profile three parameter isolator, such as an isolator having a generally puck-shaped or pad-shaped form factor. In this regard, embodiments of the above-described three parameter isolator may have a length or height (as taken along the isolator's longitudinal axis) that is less than a maximum planform dimension (e.g., an outer diameter) of the isolator. Advantageously, embodiments of the above-described three parameter isolator are readily manufacturable, durable, and lightweight. Furthermore, the above-described three parameter may have a relatively low part count, especially in embodiments wherein the main spring and tuning spring are cut into or otherwise formed in a monolithic or single piece plate structure or radially-extending wall. As a further advantage, the above-described flat plate design enables tuning of the machined springs for different sizes and stiffness, while permitting the damping properties of the isolator to vary in a substantially linear manner with load and temperature. Embodiments of the above-described isolator are also well-suited for usage in an isolation system capable of proving high fidelity damping and stiffness in six degrees of freedom.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A three parameter isolator having a longitudinal axis, the three parameter isolator comprising:
   a first damper;
   a flat plate structure coupled to the first damper and extending substantially orthogonal to the longitudinal axis;
   a main spring formed in the flat plate structure and coupled in parallel with the first damper, as taken along a first load path through the three parameter isolator; and
   a tuning spring formed in the flat plate structure, the tuning spring coupled in parallel with the main spring and in series with the first damper, as taken along a second load path through the three parameter isolator;
   wherein the flat plate structure comprises a diaphragm wall having a plurality of openings formed therein defining the main spring and the tuning spring.

2. The three parameter isolator of claim 1 wherein one of the main spring and the tuning spring is formed in an inner annular region of the flat plate structure, while the other of the main spring and the tuning spring is formed in an outer annular region of the flat plate structure.

3. The three parameter isolator of claim 2 further comprising a mount collar extending axially from the flat plate structure, the mount collar joined to an intermediate annular region of the flat plate structure located between the inner annular region and the outer annular region.

4. The three parameter isolator of claim 1 further comprising an axial extension projecting from the flat plate structure along an axis substantially parallel to the first damper.

5. The three parameter isolator of claim 4 further comprising a base piece coupled to the axial extension and to the first damper opposite the flat plate structure.

6. The three parameter isolator of claim 1 wherein the three parameter isolator has a maximum length less than an outer diameter thereof.

7. The three parameter isolator of claim 1 wherein the first damper comprises a first hermetically-sealed fluid damper.

8. The three parameter isolator of claim 1 wherein the first damper is fixedly coupled to a central region of the flat plate structure.

9. The three parameter isolator of claim 8 wherein the main spring circumscribes the tuning spring, and wherein the tuning spring circumscribes the first damper as taken along the longitudinal axis.

10. A three parameter isolator having a longitudinal axis, the three parameter isolator comprising:
    a first hermetically-sealed fluid damper, comprising:
       opposing metal bellows; and
       a piston disposed between the opposing metal bellows;
    a flat plate structure fixedly coupled to the piston of the first hermetically-sealed fluid damper and extending substantially orthogonal to the longitudinal axis;
    a main spring formed in the flat plate structure and coupled in parallel with the first hermetically-sealed fluid damper, as taken along a first load path through the three parameter isolator; and
    a tuning spring formed in the flat plate structure, the tuning spring coupled in parallel with the main spring and in series with the first hermetically-sealed fluid damper, as taken along a second load path through the three parameter isolator.

11. The three parameter isolator of claim 10 wherein one of the main spring and the tuning spring is formed in an inner annular region of the flat plate structure, while the other of the main spring and the tuning spring is formed in an outer annular region of the flat plate structure.

12. The three parameter isolator of claim 10 wherein the flat plate structure comprises a diaphragm wall having a plurality of openings formed therein defining at least one of the main spring and the tuning spring.

13. A three parameter isolator having a longitudinal axis, the three parameter isolator comprising:
    a flat plate structure extending substantially orthogonal to the longitudinal axis;
    a plurality of circumferentially-spaced dampers fixedly coupled to an outer peripheral portion of the flat plate structures;

a main spring formed in the flat plate structure and coupled in parallel with a first damper included in the plurality of circumferentially-spaced dampers, as taken along a first load path through the three parameter isolator; and a tuning spring formed in the flat plate structure, the tuning spring coupled in parallel with the main spring and in series with the first damper as taken along a second load path through the three parameter isolator.

14. The three parameter isolator of claim 13 wherein the plurality of circumferentially-spaced dampers circumscribe the tuning spring, and wherein the tuning spring circumscribes the main spring as taken along the longitudinal axis.

15. A three parameter isolator having a longitudinal axis, comprising:

first and second mounting interfaces;

at least one damper coupled between the first and second mounting interfaces;

a main spring coupled in parallel with the at least one damper, as taken along a first load path extending between the first and second mounting interfaces; and a tuning spring coupled in parallel with the main spring and in series with the at least one damper, as taken along a second load path extending between the first and second mounting interfaces;

wherein the main spring and the tuning spring comprise substantially concentric disc-shaped machined springs, which extend radially outward from the longitudinal axis.

16. The three parameter isolator of claim 15 further comprising:

a diaphragm wall oriented substantially orthogonal to the longitudinal axis; and a plurality of openings formed in the diaphragm wall, the plurality of openings defining the main spring and the tuning spring in different annular regions of the diaphragm wall.

17. The three parameter isolator of claim 16 further comprising an annular collar joined to the diaphragm wall at a location between the different annular regions in which the main spring and tuning spring are formed, the annular collar disposed between the first mounting interface and the diaphragm wall.

18. The three parameter isolator of claim 17 further comprising:

an axial extension extending from the diaphragm wall in a direction substantially opposite the annular collar; and a base piece fixedly coupled to the axial extension;

wherein the at least one damper is coupled in parallel with the axial extension and in series with the base piece, as taken along the first and second load paths, respectively.

19. The three parameter isolator of claim 15 wherein the main spring and the tuning spring are bound by first and second planes, which are spaced along the longitudinal axis and oriented substantially orthogonal thereto.

20. The three parameter isolator of claim 15 wherein the flat plate structure comprises a diaphragm wall having a plurality of openings formed therein defining at least one of the main spring and the tuning spring.

* * * * *